Patented June 3, 1941

2,244,569

UNITED STATES PATENT OFFICE 2,244,569

HIGH MELTING POINT CHOCOLATE AND METHOD OF PREPARING THE SAME

Frederic H. Penn, Dallas, Tex.

No Drawing. Application December 18, 1940, Serial No. 370,722

8 Claims. (Cl. 99—23)

REISSUED
MAY 5 1942

This invention relates to high melting point chocolate and method for producing the same.

Chocolate is one of the most popular flavors, and is in wide use in the confectionery and baking industries.

The chocolate now in general use has a tendency to soften at temperatures around 33° C. (91° F.) and must be kept under refrigeration to be in a marketable condition, and when exposed to air for a prolonged time, the chocolate becomes gray.

The chocolate coating used for confectionery and bakery products softens and becomes sticky in warm climates. The low melting point of chocolate has long been a problem for the manufacturers of chocolate products to contend with in the marketing of chocolate products in warm climates. Therefore, it has been necessary to keep chocolate products under refrigeration, and when refrigeration was not available, the sale and use of chocolate products have been retarded.

The melting point of chocolate is about 33° C. (91° F.) and to prevent the softening of chocolate, the melting point must be above 33° C. (91° F.)

Chocolate is a complex product, comprising about 50% fatty material, 6% fiber, 6% ash, 35% starch, 1.5% theobromine, and moisture 2 to 3%.

Many attempts have been made to prepare high melting point chocolate, principally with the addition of higher melting point substances, as starch or sugar. None of these attempts has been successful.

I have discovered that by hydrogenating chocolate, a high melting point chocolate can be obtained. This can be accomplished by hydrogenating the chocolate to any desired melting point in the substantial absence of air and moisture. The melting point can be controlled by the degree of temperature, pressure and time employed in the hydrogenation of the chocolate. By varying the temperature, pressure or time, melting points ranging from about 38° C. (100° F.) to about 65° C. (149° F.) can be obtained. The results obtained from many experiments indicate that hydrogenation temperatures above 150° C. (302° F.) affect the flavor of the chocolate, and for this reason, the lower the hydrogenation temperature, the better the flavor. The preferred temperature range is from about 100° C. (212° F.) to about 150° C. (302° F.).

Illustrative of one of the preferred methods for obtaining high melting point chocolate: Commercial medium roast chocolate is heated in an open vessel at a temperature above 100° C. (212° F.) to eliminate the moisture. 300 grams of this heated chocolate is placed in a rocking hydrogenation bomb of 750 ml. capacity, 20″ x 2″ diameter, electrically heated. The bomb is closed and the air is eliminated by passing hydrogen through the bomb. After the elimination of the air, the bomb is filled with hydrogen until a pressure of about 2,000 pounds is obtained. The chocolate is then hydrogenated in the presence of an active nickel oxide catalyst, at a temperature of about 150° C. (302° F.) and at a pressure of about 2,000 pounds, for about 1½ hours. After removing the chocolate from the hydrogenation bomb, the chocolate is cooled with continuous stirring until the chocolate reaches its setting point. After allowing the chocolate to set for about 24 to 48 hours, the chocolate is ready for use. The resultant hydrogenated chocolate has a melting point of about 56.5° C. (133° F.).

By following the procedure in the example and increasing the hydrogenating time to about 2½ hours, chocolate having a melting point of about 65° C. (149° F.) can be obtained. Likewise, by reducing the temperature to about 105° C. (217.4° F.) and the hydrogenation time to 1½ hours, at a pressure of 2,000 pounds, chocolate having a melting point of about 49° C. (120° F.) can be obtained.

The melting point of non-hydrogenated chocolate can be increased by adding hydrogenated chocolate having a higher melting point than the non-hydrogenated chocolate. For example, chocolate containing about 30% of high melting point chocolate may be prepared as follows: 128 grams of hydrogenated chocolate having a melting point of about 65° C., (149° F.) and 300 grams of non-hydrogenated chocolate are mixed together at a temperature of about 68.33° C. (155° F.) and then allowed to cool with stirring until the chocolate reaches its setting point. The resultant chocolate has a softening point of about 46.1° C. (115° F.).

As the physical characteristics and the viscosity of chocolate do not permit filtering out the powdered type catalysts now in general use, the active nickel oxide catalysts must be in pellet or lump form. Suitable active nickel oxide catalysts may be prepared as follows: Raney active nickel oxide catalyst in wet powdered form is pressed into tablets of about one inch diameter, ⅜ inch thick, in a hydraulic press, at a pressure of about 15,000 pounds. During the pressing of the wet powdered Raney active nickel oxide catalyst, the water is pressed out and the catalyst is in a comparatively dry form. The catalyst tablets are then further dehydrated by heating them in vegetable oil, such as cotton seed oil, at a temperature above 100° C. (212° F.). About twenty of these active nickel oxide tablets are placed in a nickel wire cage or strung on a nickel wire rod and placed in the hydrogenation bomb with the chocolate.

Raney active nickel oxide in solid tablet form is the preferred catalyst, but other hydrogenating catalysts may be used.

This invention is not limited to any specific process of hydrogenation or hydrogenation apparatus, as chocolate may be hydrogenated in suitable hydrogenation equipment whereby the necessary hydrogen pressures can be maintained with circulation or agitation of the chocolate, without the presence of air, at the required temperatures in the presence of solid catalysts.

Having described my invention, I claim:

1. A process for increasing the melting point of chocolate comprising hydrogenating chocolate at a temperature of from about 100° C. to about 150° C.

2. A process for increasing the melting point of chocolate comprising hydrogenating chocolate in the substantial absence of air.

3. A process for increasing the melting point of chocolate comprising hydrogenating chocolate in the substantial absence of air and moisture.

4. A process for increasing the melting point of chocolate comprising hydrogenating chocolate at a hydrogenating temperature below 150° C.

5. As a new article of manufacture, a product produced in accordance with the process of claim 1.

6. As a new article of manufacture, a product produced in accordance with the process of claim 2.

7. As a new article of manufacture, a product produced in accordance with the process of claim 3.

8. As a new article of manufacture, a product produced in accordance with the process of claim 4.

FREDERIC H. PENN.